(No Model.)
J. W. ERSKINE, Dec'd.
A. ERSKINE, Administratrix.
COMPOUND BELT SHIFTER, OILER, AND SHAFT CLEANER.
No. 367,900. Patented Aug. 9, 1887.
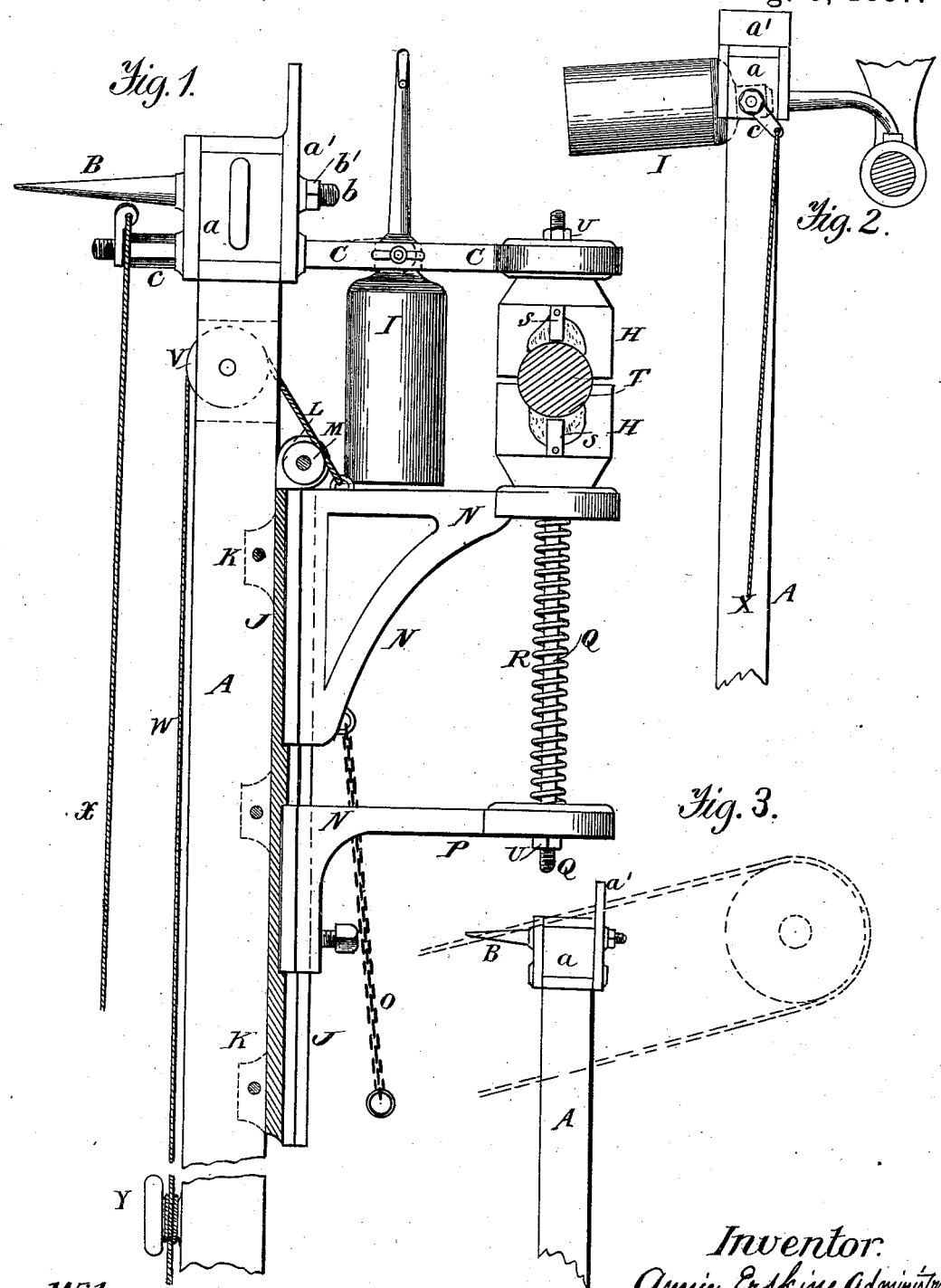

UNITED STATES PATENT OFFICE.

ANNIE ERSKINE, OF CHESTER, PENNSYLVANIA, ADMINISTRATRIX OF JOHN W. ERSKINE, DECEASED.

COMPOUND BELT-SHIFTER, OILER, AND SHAFT-CLEANER.

SPECIFICATION forming part of Letters Patent No. 367,900, dated August 9, 1887.

Application filed February 15, 1887. Serial No. 227,749. (No model.)

*To all whom it may concern:*

Be it known that JOHN W. ERSKINE, late a resident of Chester, Delaware county, Pennsylvania, (now deceased,) did invent an Improvement in Compound Devices for Shifting Belts, Oiling Machinery, and Cleaning Shafts, of which the following is a specification.

The special object of the invention is to make it safe to workmen to oil machinery, put on or take off belts, and clean shafting, especially in cotton, woolen, and silk mills or factories; also, in rolling-mills, machine-shops, and wherever machinery is employed. It is also intended to clean shafting without any interference with the operation of the mill, and to enable men to work amid machinery without danger to life.

Figure 1 of the drawings is a side elevation showing all the parts of the invention; Fig. 2, a front elevation when using oil-can. Fig. 3 is an elevation showing the machine as a belt-shifter.

In the drawings, A represents the staff to which the invention is attached, and which is provided with the head $a$, cast with the belt-guard $a'$.

B is the belt-shifter fastened to the staff. It has the shank $b$, threaded at the end, so that when passed through the head $a$ it may be held by a nut, $b'$. C is a bar, which is also passed through head $a$ and held by the lever-nut $c$, so as to hold the shaft-cleaner block H, also to hold the oil-can I.

J represents a stationary guide attached to the staff A by means of the screw-clamped cleats K. The guide J is provided at its top with the head L, which is grooved to hold the friction-pulley M.

N is a movable bracket attached to the guide J, (by means of a groove which receives said guide,) and extended out to support the cleaner-block H. The bracket N is connected with a stationary bracket, P, also attached to guide J by a set-screw or other suitable fastening. The two brackets N P, by a screw-bolt, Q, which passes through both, are so connected that the bracket N may be moved down on said bolt against the resistance of a spiral spring, R, which surrounds the bolt. The purpose of this is that the bracket N may yield when a lump or twist occurs in the shafting.

The cleaner-blocks H are preferably made of hard wood, to which is attached emery-cloth, emery-paper, or other cleaning substance, held in place by the springs S. The cleaner-blocks H H have corresponding concavities, in which the shaft T is held as it revolves, while said blocks are secured to the brackets N P by the countersunk and headed bolts U. V represents a friction-pulley arranged on the inside of a slot in the staff A, and over which passes the cord W, by which the movable bracket N is raised up by hand, while it may be pulled down by the chain O.

X is a cord attached to the lever-nut $c$, so as to tilt the oil-can at any angle desired for oiling the machinery.

Y is a belaying-cleat for the cord W when it is wished to hold up the bracket N.

In machinery without loose pulleys the belt is allowed to rest on the conical shifter B, where it may be easily moved so as to throw it on or off the pulley, as shown in Fig. 3 of the drawings.

In order to bring the oiler into suitable position to discharge into the bearing of a shaft, the cord X is pulled so as to turn the bar C into the position shown clearly in Fig. 2 of the drawings.

In order to clean a shaft with any suitable material, it is clamped between the cleaners H H and allowed to rotate until it is thoroughly cleansed.

Having described the invention, what is claimed as new, and desired to be secured by Letters Patent, is—

The described compound device, comprising a frame carrying a belt-shifter, shaft-cleaner, and shaft-oiler, arranged as shown and described.

ANNIE ERSKINE,
*Administratrix of J. W. Erskine, Deceased.*

Witnesses:
HUBERT J. RILEY,
CHARLES L. THOMSON.